US009624658B2

(12) United States Patent
Hannah et al.

(10) Patent No.: US 9,624,658 B2
(45) Date of Patent: Apr. 18, 2017

(54) STORM WATER FILTER AND COMPONENTS THEREOF AND METHODS OF INSTALLATION AND USE

(75) Inventors: Michael Morton Hannah, Auckland (NZ); Gregory Paul Yeoman, Auckland (NZ); Gary John Lawford, Wellsford (NZ); Nicholas Alan Vigar, Auckland (NZ)

(73) Assignee: EHL Limited, Auckland (NZ)

( * ) Notice: Subject to any disclaimer, the term of this patent is extended or adjusted under 35 U.S.C. 154(b) by 611 days.

(21) Appl. No.: 13/824,376

(22) PCT Filed: Sep. 16, 2011

(86) PCT No.: PCT/NZ2011/000193
§ 371 (c)(1),
(2), (4) Date: Aug. 13, 2014

(87) PCT Pub. No.: WO2012/036569
PCT Pub. Date: Mar. 22, 2012

(65) Prior Publication Data
US 2014/0374332 A1 Dec. 25, 2014

(30) Foreign Application Priority Data

Sep. 17, 2010 (NZ) ........................ 588049

(51) Int. Cl.
*E03F 5/04* (2006.01)
*E03F 5/14* (2006.01)
*A01G 9/02* (2006.01)

(52) U.S. Cl.
CPC ................ *E03F 5/14* (2013.01); *A01G 9/026* (2013.01); *E03F 5/0404* (2013.01)

(58) Field of Classification Search
CPC ......... E03F 5/0401; E03F 5/0404; E03F 5/14; B65B 67/1205; A01G 9/026
(Continued)

(56) References Cited

U.S. PATENT DOCUMENTS

| 122,209 A | 12/1871 | Ashman |
| 143,774 A | 10/1873 | Moore |

(Continued)

FOREIGN PATENT DOCUMENTS

| FR | 1 456 324 | * 9/1966 |
| NZ | 223098 | 10/1989 |

(Continued)

OTHER PUBLICATIONS

International Preliminary Report on Patentability, mailed Mar. 28, 2013 International Application No. PCT/NZ2011/000193, International Filing Date: Sep. 16, 2011, 2 pgs.

(Continued)

*Primary Examiner* — Christopher Upton
(74) *Attorney, Agent, or Firm* — Thomas Coester Intellectual Property

(57) ABSTRACT

A storm water drain filter including a collapsible frame supporting a filter bag. The filter may be installed in a stormwater drain pit to capture contaminants and particulate matter before it enters a stormwater drain. The collapsible frame is light weight, compact, simple and inexpensive. The filter bag is secured to the frame so as to maintain its shape and avoid deformation. There is also disclosed a method of installing a stormwater drain filter in a stormwater drain pit to provide an effective seal between the stormwater drain filter and the pit.

29 Claims, 16 Drawing Sheets

(58) Field of Classification Search
USPC ....... 210/163, 164, 170.03; 248/99; 47/65.8, 47/66.7
See application file for complete search history.

(56) References Cited

U.S. PATENT DOCUMENTS

| | | | |
|---|---|---|---|
| 222,140 A | 12/1879 | Lindsay | |
| 228,084 A | 5/1880 | Lavery | |
| 300,764 A | 6/1884 | Collins | |
| 338,892 A | 3/1886 | Walker | |
| 658,639 A | 9/1900 | Guion | |
| 775,491 A | 11/1904 | Hogoboom | |
| 860,506 A | 7/1907 | Williams | |
| 1,910,186 A | 5/1933 | Sisk | |
| 4,413,800 A * | 11/1983 | Kelson | B65B 67/1205 248/99 |
| 4,419,232 A | 12/1983 | Arntyr | |
| 5,672,271 A | 9/1997 | Dye | |
| 5,855,774 A | 1/1999 | Boelter | |
| 5,958,226 A | 9/1999 | Fleischmann | |
| 5,985,157 A | 11/1999 | Leckner et al. | |
| 6,045,691 A | 4/2000 | McDermott | |
| 6,059,964 A | 5/2000 | Strawser, Sr. | |
| 6,126,817 A | 10/2000 | Duran | |
| 6,149,803 A | 11/2000 | Diloreto, Jr. et al. | |
| 6,214,216 B1 | 4/2001 | Isaacson | |
| 6,294,095 B1 | 9/2001 | Lewis | |
| 6,531,059 B1 | 3/2003 | Morris et al. | |
| 6,551,023 B2 | 4/2003 | Allard | |
| 6,749,366 B1 * | 6/2004 | Chinn | E03F 5/0404 210/164 |
| 7,112,274 B1 * | 9/2006 | Sanguinetti | E03F 5/0404 210/163 |
| 7,140,516 B2 | 11/2006 | Bothor | |
| 7,153,417 B2 | 12/2006 | Happel | |
| 7,201,843 B2 | 4/2007 | Sasaki | |
| 7,670,483 B2 * | 3/2010 | Ringenbach | E03F 5/0404 210/163 |
| 2002/0048490 A1 | 4/2002 | Allard et al. | |
| 2002/0113025 A1 * | 8/2002 | Gauldin | E03F 5/0404 210/163 |
| 2003/0047497 A1 * | 3/2003 | Harris | E03F 5/0404 210/163 |
| 2004/0016692 A1 | 1/2004 | Sasaki et al. | |
| 2005/0067338 A1 * | 3/2005 | Page | E03F 5/0404 210/164 |
| 2008/0179229 A1 * | 7/2008 | Dorsey | E03F 5/0404 210/163 |

FOREIGN PATENT DOCUMENTS

| | | |
|---|---|---|
| NZ | 272419 | 1/1997 |
| NZ | 277884 | 7/1997 |
| WO | WO-9929973 | 6/1999 |
| WO | WO-2004024288 | 3/2004 |

OTHER PUBLICATIONS

Written Opinion of the International Searching Authority, mailed Jan. 5, 2012, International Application No. PCT/NZ2011/000193, International Filing Date: Sep. 16, 2011, 11 pgs.

\* cited by examiner

STORM WATER FILTER AND COMPONENTS THEREOF AND METHODS OF INSTALLATION AND USE

FIELD OF THE INVENTION

This invention relates to a filtration apparatus for removing and recovering particulates and contaminants from storm water run-off. It also relates to methods of installing and maintaining storm water drain filters.

BACKGROUND OF THE INVENTION

Storm water (also know as stormwater) and contaminants (i.e. gross particulate matter, sediment, oil, grease, hydrocarbons, heavy metals etc,) enters storm water drains via 'pits' also know as catch basins and stormwater inlets. It is desirable to retain these contaminants at the point of entry to the stormwater piping system and to periodically remove them to avoid blockage and contamination of the stormwater drainage system. A wide variety of filters have been developed for this purpose and a number of relevant prior patents are discussed below.

U.S. Pat. No. 122,209 describes a removable grate that is inserted into a storm water drain inlet to effectively capture gross solids and prevent ingress to the storm water system.

U.S. Pat. No. 143,774 describes a removable sediment receptacle and associated flared inlet acting as both a sediment filter and foul air trap.

U.S. Pat. No. 4,419,232 describes a frameless tapered filter bag insert for a storm water drain suspended above the sump floor.

U.S. Pat. No. 5,985,157 describes a filter device for removing suspended solids from storm water that includes a filter bag constrained within a rigid cage structure.

U.S. Pat. No. 6,149,803 describes a tapered storm water filter bag that is supported and shaped by an internal frame.

U.S. Pat. No. 6,551,023 describes a storm water filtration system utilising a support basket for the filter constructed of netting material, together with cables traversing the bottom of the basket in an x-shape.

U.S. Pat. No. 658,639 describes a receiving basin which includes a mesh receptacle that extends to the internal volume of a storm water inlet sump.

U.S. Pat. No. 7,201,843 describes a storm water filter bag that includes a rectangular collar as an inlet and a central tubular filter for capturing sediment.

The primary objectives of stormwater filter systems are:
  to retain a large volume of contaminants, compared to the size and dimensions of a specific catchpit—high volume efficiency;
  to maintain performance and, throughput of the catchpit during periods of high flow;
  to provide dimensional stability such that the filter does not bulge and beyond the dimensions of the inlet preventing removal;
  to be able to be easily removed for maintenance by hand, without the requirement for mechanical lifting or induction by vacuum truck Recent filter systems that utilise a filtration mesh/fabric body can be broadly categorized into two types:
  Filters that are flexible and self-supporting
  Filters that are flexible and supported by an external rigid cage.

Filters that are flexible and self-supporting tend to be of much smaller volume than the pits into which they are fitted, due to the fact that unsupported flexible materials cannot provide dimensional stability. This has a detrimental effect on the volume of material that can be retained in the filter and maintenance requirements.

Filters that are supported by external rigid cages are provided with dimensional stability as the filter body cannot bulge or expand beyond the limits of the cage. However, these cages can add significantly to the mass of the filter apparatus and cannot be collapsed for transport or bespoke fitting to particular catchpits.

Where a bag is supported by a rigid frame it is bulky to transport and handle, uses much material to achieve rigidity, and can be difficult to install since many pits have differences in geometry or manufacturing flaws some times requiring a custom fit. The designs may also suffer from bulging of the filter bag which can block a pit outlet and place localised stress on the filter bag. In addition the bulging of the bag can cause it to be trapped in the frame or pit walls, to the extent it is not removable with out considerable effort or damage to the bag or frame. The designs may also suffer from small filter area and containment volume requiring a high frequency of maintenance. The designs may also be complex, expensive to manufacture and pose a potential fire risk.

It is an object of the invention to provide an improved storm water filter and components and methods of installation and use or to at least provide the public with a useful choice.

Reference to any prior art in this specification does not constitute an admission that such prior art forms part of the common general knowledge.

SUMMARY OF THE INVENTION

According to one exemplary embodiment there is provided a light weight collapsible frame for supporting a storm water drain bag including a plurality of rigid elements that may be assembled to form a rigid self supporting frame and disassembled into a collapsed form for transport.

According to another exemplary embodiment there is provided a storm water filter bag having a base and a plurality of side walls joined at corners including attachment elements at the corners positioned for engagement to a supporting frame such that as the bag fills bulging of the side walls of the bag is resisted by the attachment elements retaining the side walls in tension between the frame.

According to a further exemplary embodiment there is provided a storm water drain filter including:
  a. a collapsible frame consisting of a plurality of rigid elements that may be assembled to form a rigid frame and disassembled into a collapsed form for transport; and
  b. a bag having connectors positioned about its periphery for attachment to the frame, when assembled, so as to maintain the shape of the bag in use.

There is further provided a storm water drain bag having lateral stiffening elements attached to or contained within the bag to assist in maintaining dimensional stability of the bag during use.

According to another exemplary embodiment there is provided a storm water drain system including such a storm water drain filter.

According to a still further exemplary embodiment there is provided a method of fitting a storm water drain filter comprising fitting a storm water filter in a pit and taping between the top of the storm water drain filter and the pit opening to provide seal between the storm water drain filter and the pit or by sealing the gap between the top of the storm water drain filter and the pit opening by attaching a compressible layer between the stormwater drain filter and the pit.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Figure 1:
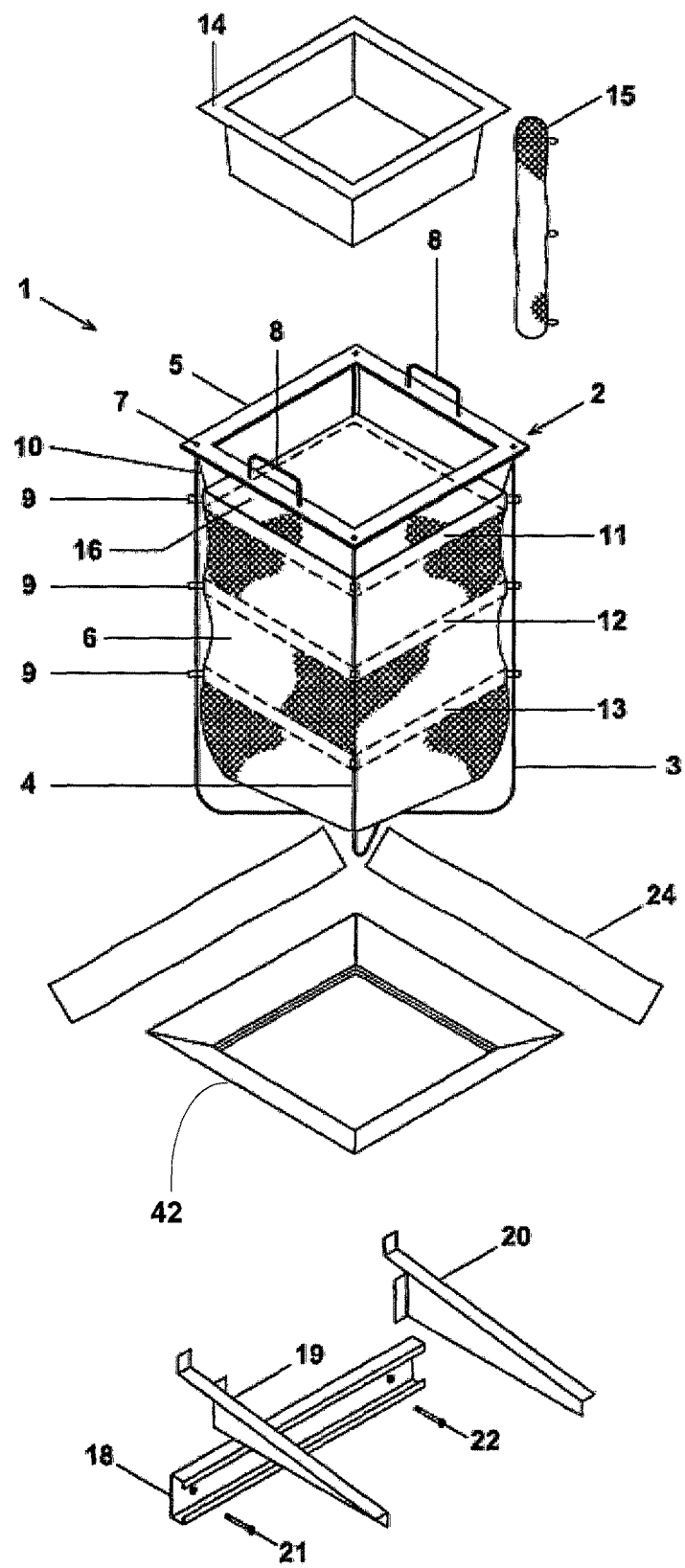
FIG. 1 shows an exploded perspective view of a storm water drain filter system.
Figure 2:
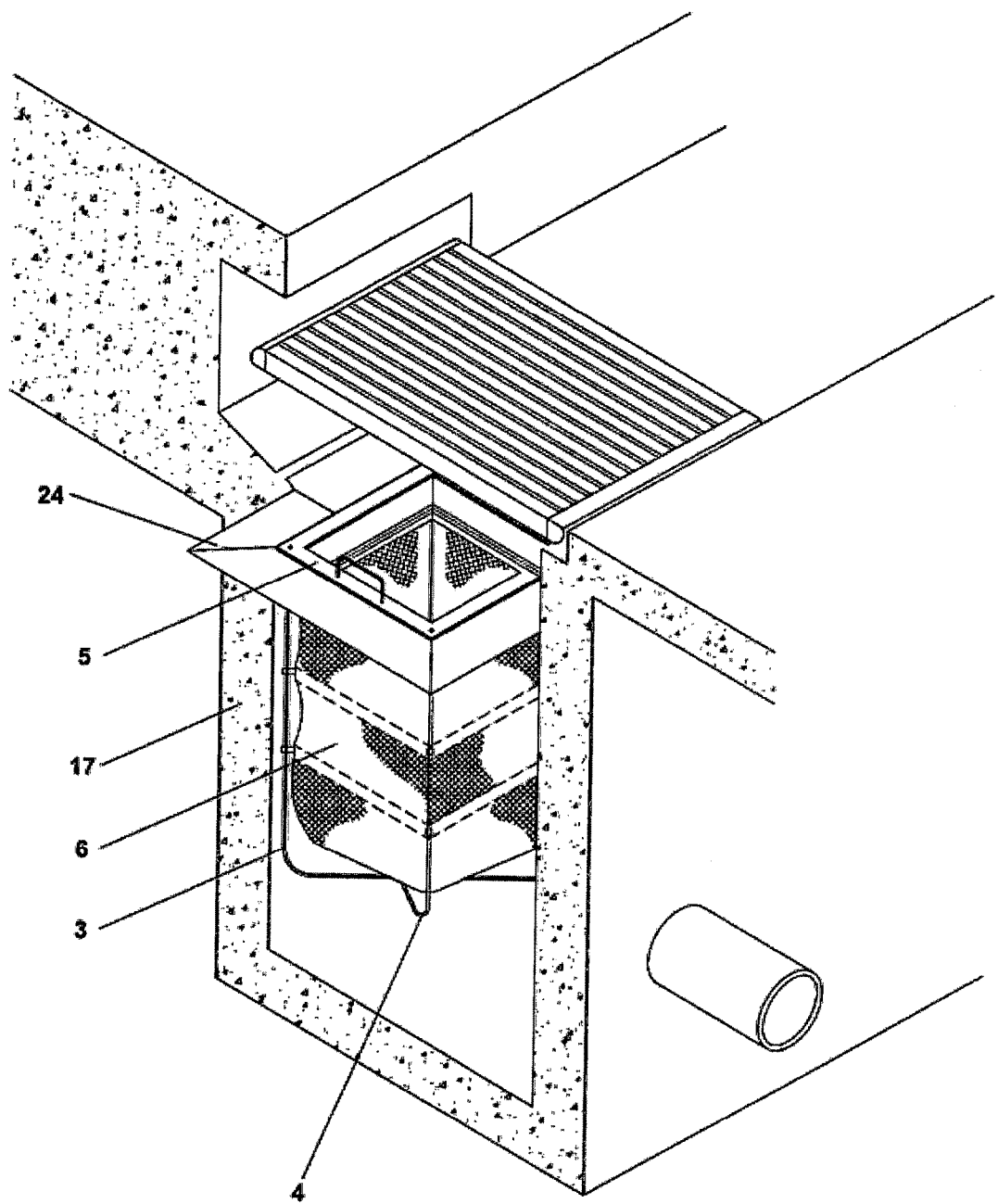
FIG. 2 shows a perspective view of an assembled storm water drain filter system installed in a pit.
Figure 17:
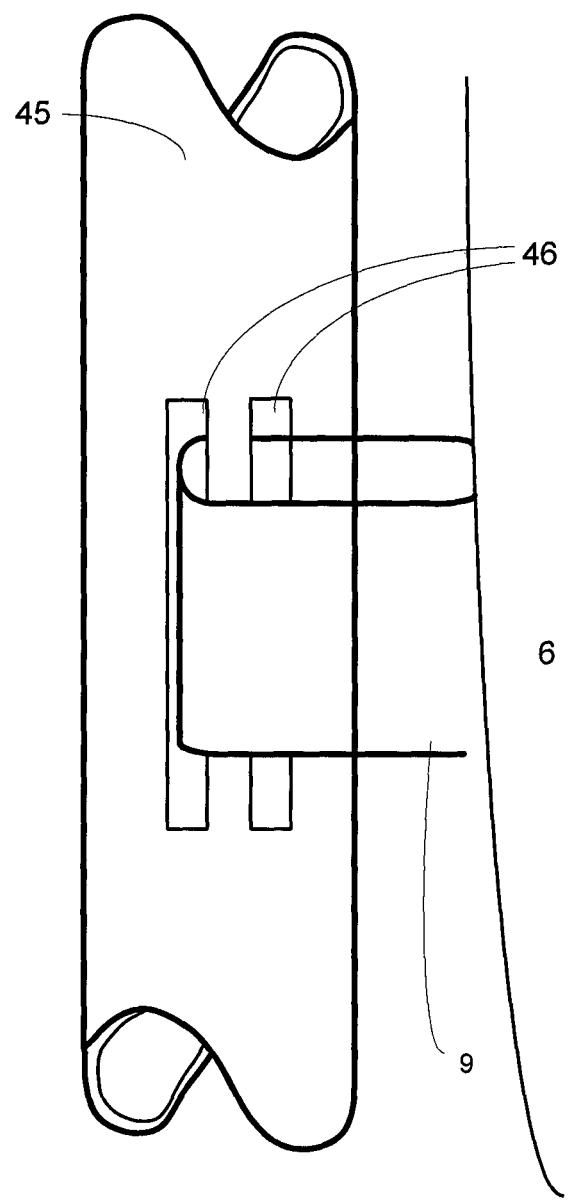
FIG. 17 illustrates an embodiment of the invention in which U shaped hoops may include slots to receive the bag side attachment elements to prevent them catching on the side of the pit during removal of the filter bag and frame during maintenance.

Referring to FIGS. 1 and 2 there is shown a storm water drain filter system 1 including a frame 2 formed by a pair of U shaped rigid hoops 3 and 4 secured to top plate 5 which supports a filter bag 6. U shaped hoops 3 and 4 are pivotally connected together where they overlap and are secured to top plate 5 in this embodiment by nuts 7 (only one of which is indicated) secured to threaded ends of U shaped hoops 3 and 4. Removable fasteners in the form of quick release elements such as clips, push-fit connectors or key and slot connectors may be used instead of bolts 7. The U shaped hoops may be formed of a material such as stainless steel, painted mild steel, fiberglass or plastic or other suitable rigid material. Although 2 hoops are shown in this embodiment 3 or more may be used for larger filters. In a preferred embodiment the U shaped hoops are tapered to a narrower width at the base to provide clearance when removing the frame for maintenance. In a further embodiment shown in FIG. 17 the U shaped hoops 45 may include slots 46 to receive the bag side attachment elements 9 so as to prevent them catching on the side of the pit during removal of the filter bag and frame during maintenance.

Top plate 5 has handles 8 which may be used to raise and lower the filter into a pit.

Whilst handles 8 are shown as C shaped metal handles they may be in the form of straps, loops, mechanical lifting eyes etc. Top plate 5 may be formed of plastic, fiberglass, stainless steel, aluminium or other suitable rigid material. Whilst top plate 5 is shown in the form of a plate it may be formed from rods or bars.

Figure 16:
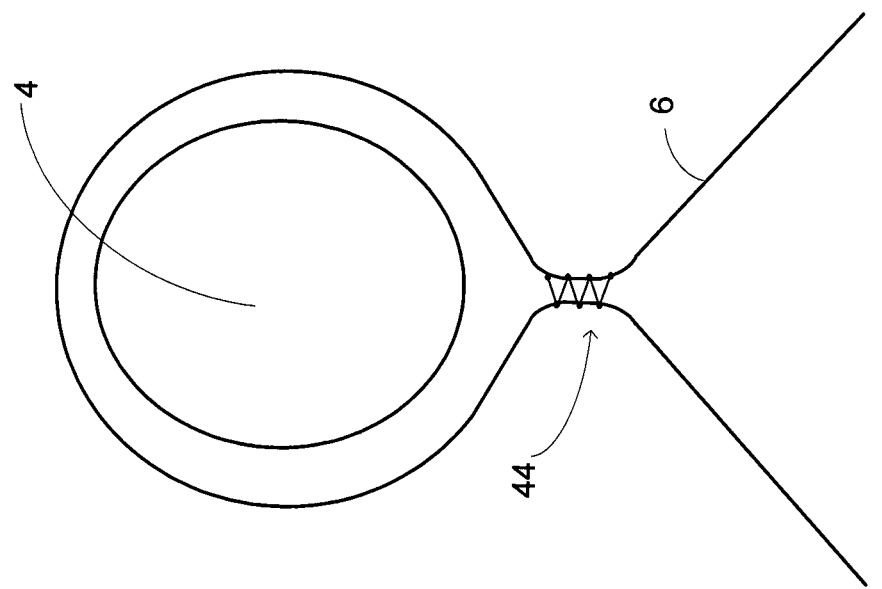
FIG. 16 illustrates an embodiment in which side attachment elements may be in the form of a durable sleeve capable of withstanding the wear and tear of removal and replacement during maintenance
Figure 15:
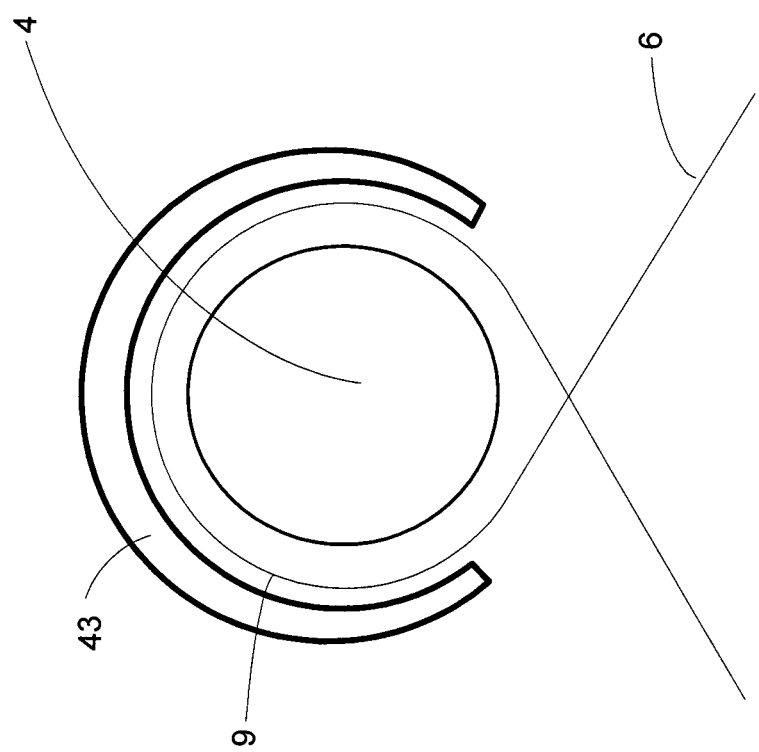
FIG. 15 illustrates an embodiment in which a protection sleeve is fitted over the side attachment elements to prevent them catching on the side of the pit during removal of the filter bag and frame during maintenance.

The storm water filter bag 6 may be formed of permeable material, impermeable material or a combination of permeable and impermeable material (as described later). In its simplest form bag 6 may simply be formed of mesh such as a metal mesh, a synthetic mesh, a fire retardant mesh, glass fiber mesh, needle punched fabric and other 'non-mesh' flexible materials such as geotextile cloth. Bag 6 may be secured to frame 2 by side attachment elements 9 provided about the periphery of the bag and top attachment elements 10 provided at the top of the bag (only the elements for one corner being indicated). The side attachment elements 9 may be in the form of loops threaded through hoops 3 and 4 (although this requires disassembly of the frame to change the bag). Alternatively side attachment elements 9 may be in the form of detachable elements such as clips or Velcro™ or other fastening strap elements. In the embodiment shown in FIG. 16 the side attachment elements may be in the form of a durable sleeve capable of withstanding the wear and tear of removal and replacement during maintenance. In this case a seam 44 is sewn along each vertical corner of bag 6 to accommodate the vertical section of a hoop 4 therein. In another embodiment shown in FIG. 15 a protection sleeve 43 is fitted over the side attachment elements 9 to prevent them catching on the side of the pit during removal of the filter bag and frame during maintenance.

Bag 6 may be provided with stiffening elements to provide additional support for the bag across its flat faces. Horizontal battens may be provided in the form of upper battens 11 along the upper edge of the bag, central battens 12 around the mid region of the bag and lower battens 13 around the lower region of the bag. Multiple central battens may be provided for deep filter systems. Vertical battens may also be provided for deep bags. The battens may be formed of fiberglass, plastic, carbon fiber, aluminium or other suitable rigid material.

Figure 3:
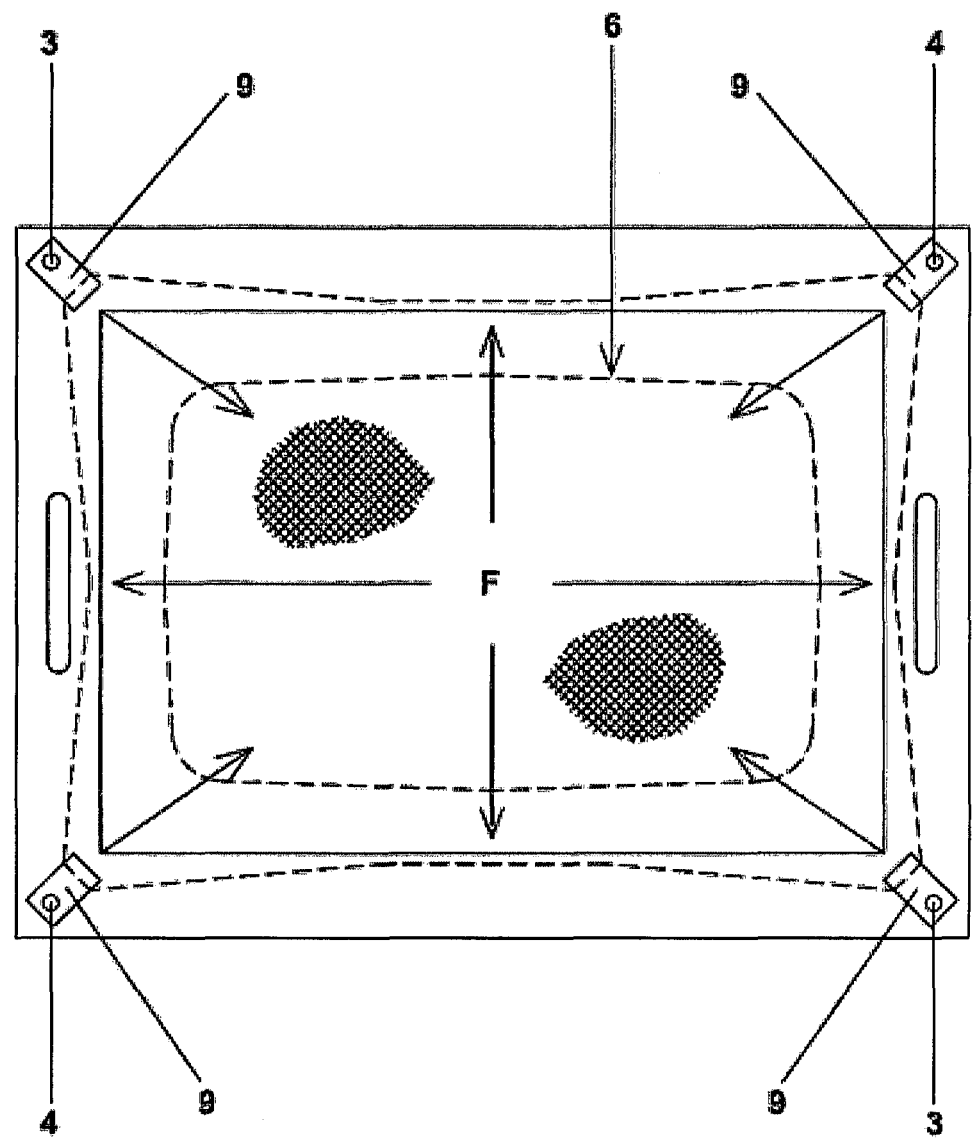
FIG. 3 is a top view of a storm water drain filter illustrating the forces on the filter bag.
Figure 4:
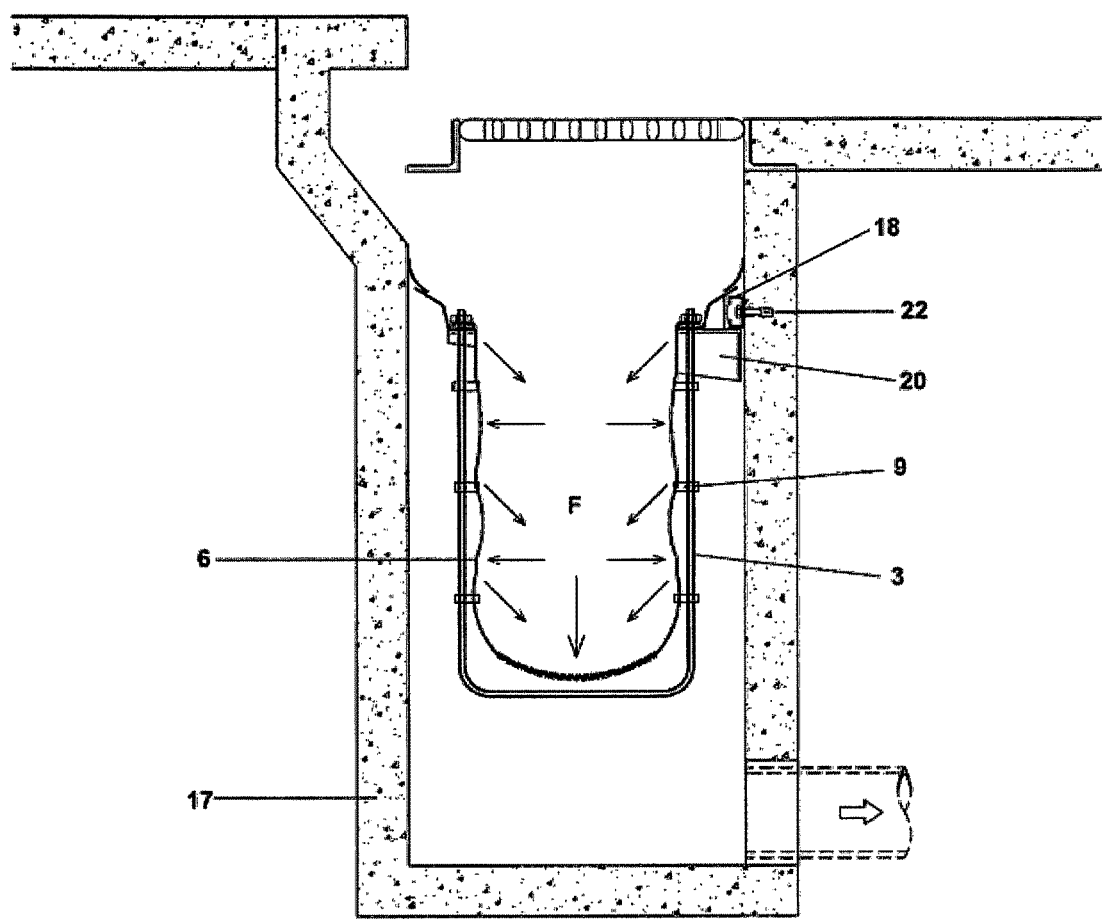
FIG. 4 is a side cross sectional view of a storm water drain filter illustrating the forces on the filter bag.

As shown in FIGS. 3 and 4 the arrangement is such that as the bag 6 fills outwards forces F exerted on the flat side walls of the bag are resisted by maintaining the side walls in tension by way of the attachment elements 9 connecting the corners of the bag to the rigid frame.

The frame is collapsible so that when transported, U shaped hoops 3 and 4 are separated from top plate 5 and folded together about their pivotal connection at the base so that the frame is compact for transportation. When assembled as shown in FIGS. 1 and 2 the frame is rigid and self supporting.

Figure 5:
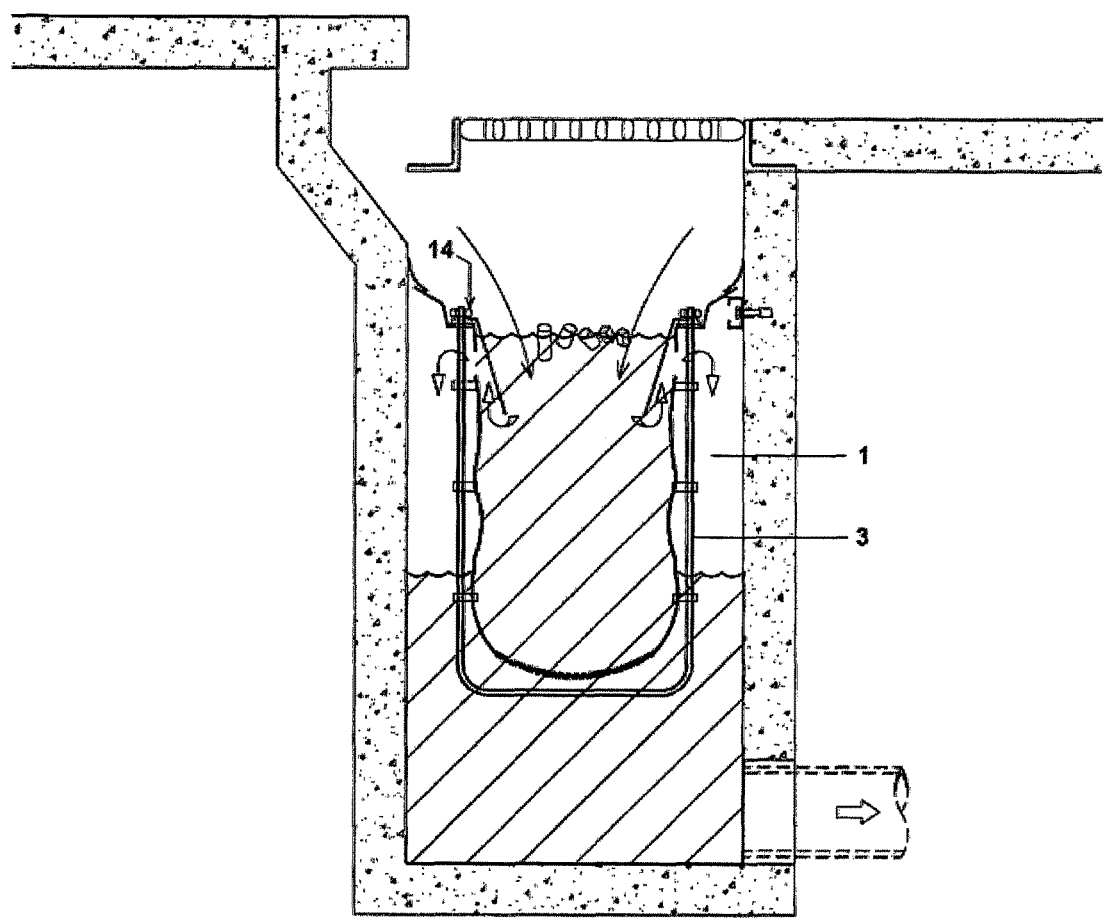
FIG. 5 is a side cross sectional view of a storm water drain filter illustrating the capture of floatable material.

An inlet channel 14 may be provided in top plate 5 to retain floatable material as illustrated in FIG. 5. This may be fixed or removable. Water is able to flow in through inlet channel 14 and through the walls of bag 6 during normal water flow conditions. During high water flow conditions water siphons through the overflow gap 16 provided between the top of the bag 6 and top plate 5 while the inlet channel 14 prevents the passage of floatable material into the storm drain. Inlet channel 14 is removable for ease of removal of material captured within bag 6.

An absorbent and/or adsorbant bag 15 may be provided within the filter to remove hydrocarbons and other contaminants as is well known.

Figure 6:
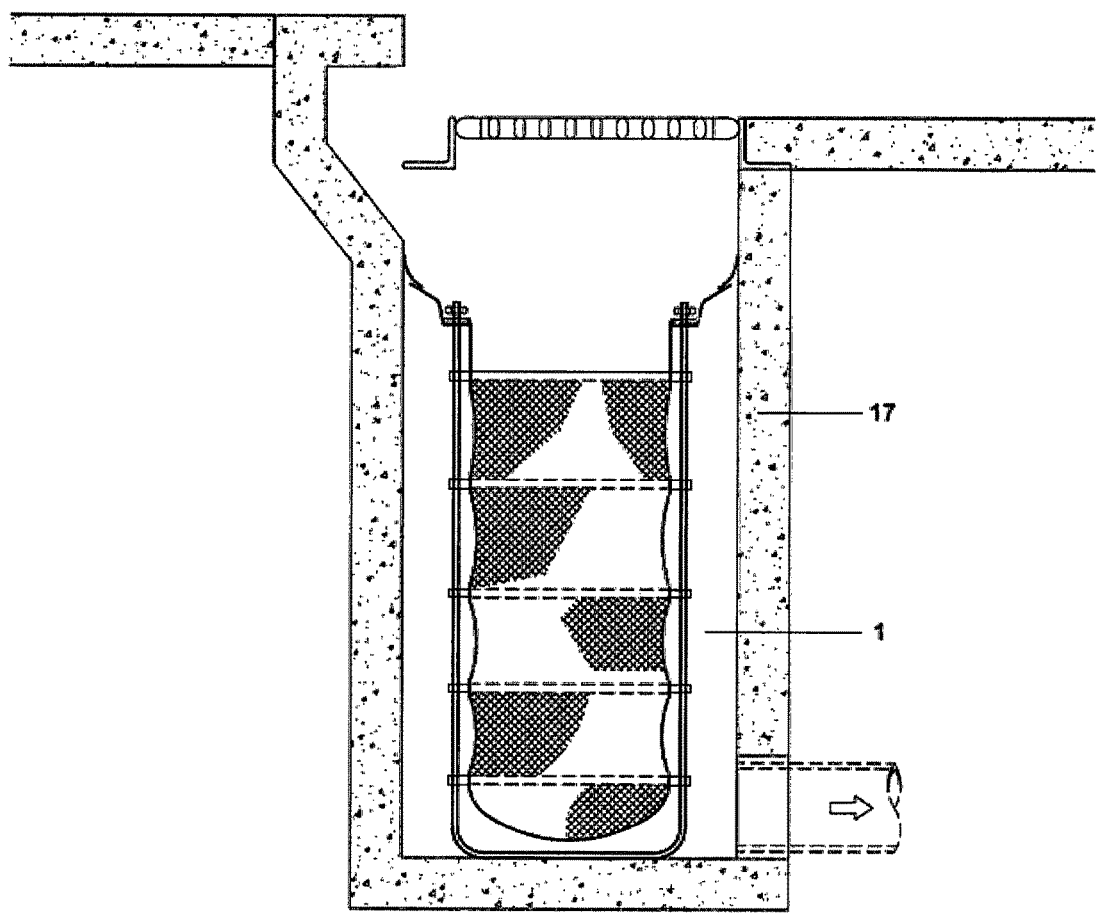
FIG. 6 shows a side view of a storm water drain filter sitting on the floor of a pit.
Figure 7:
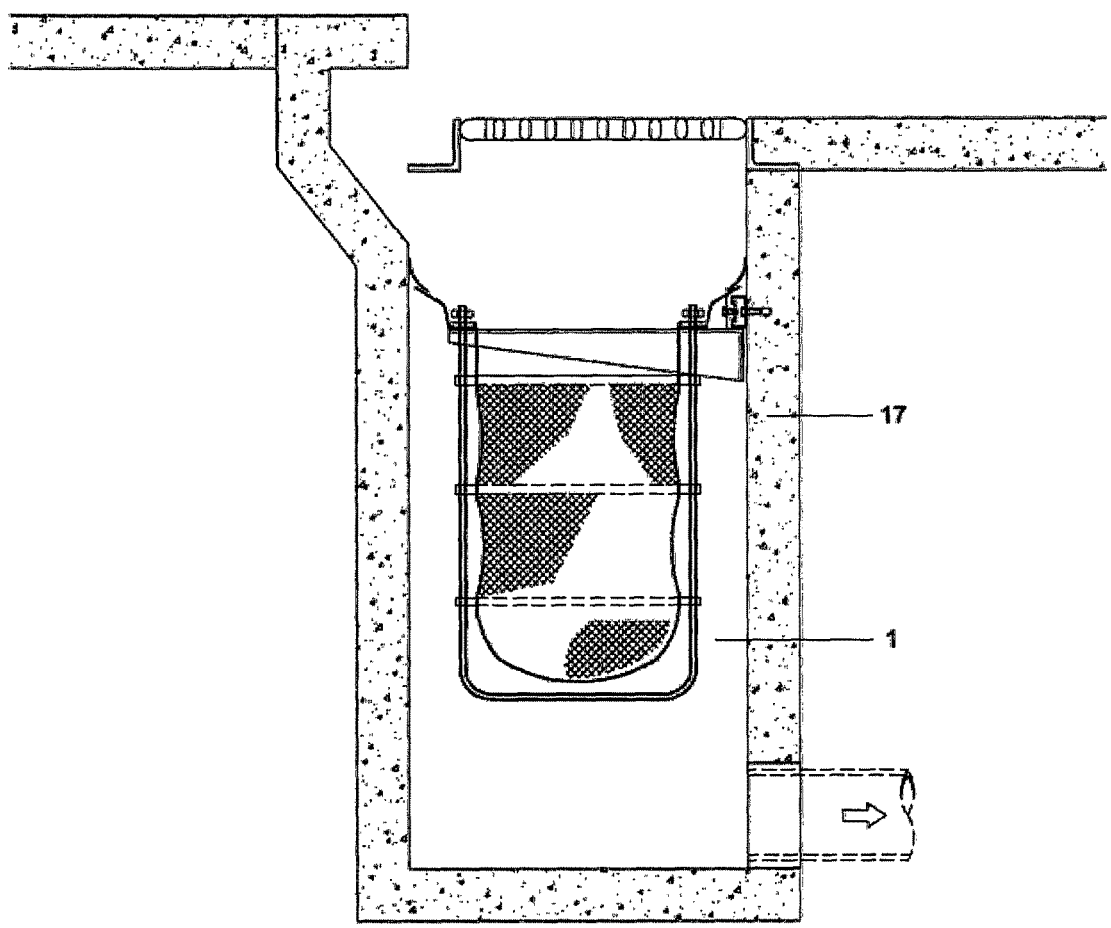
FIG. 7 shows a side view of a storm water drain filter secured to a wall of a pit via a cantilever bracket.
Figure 8:
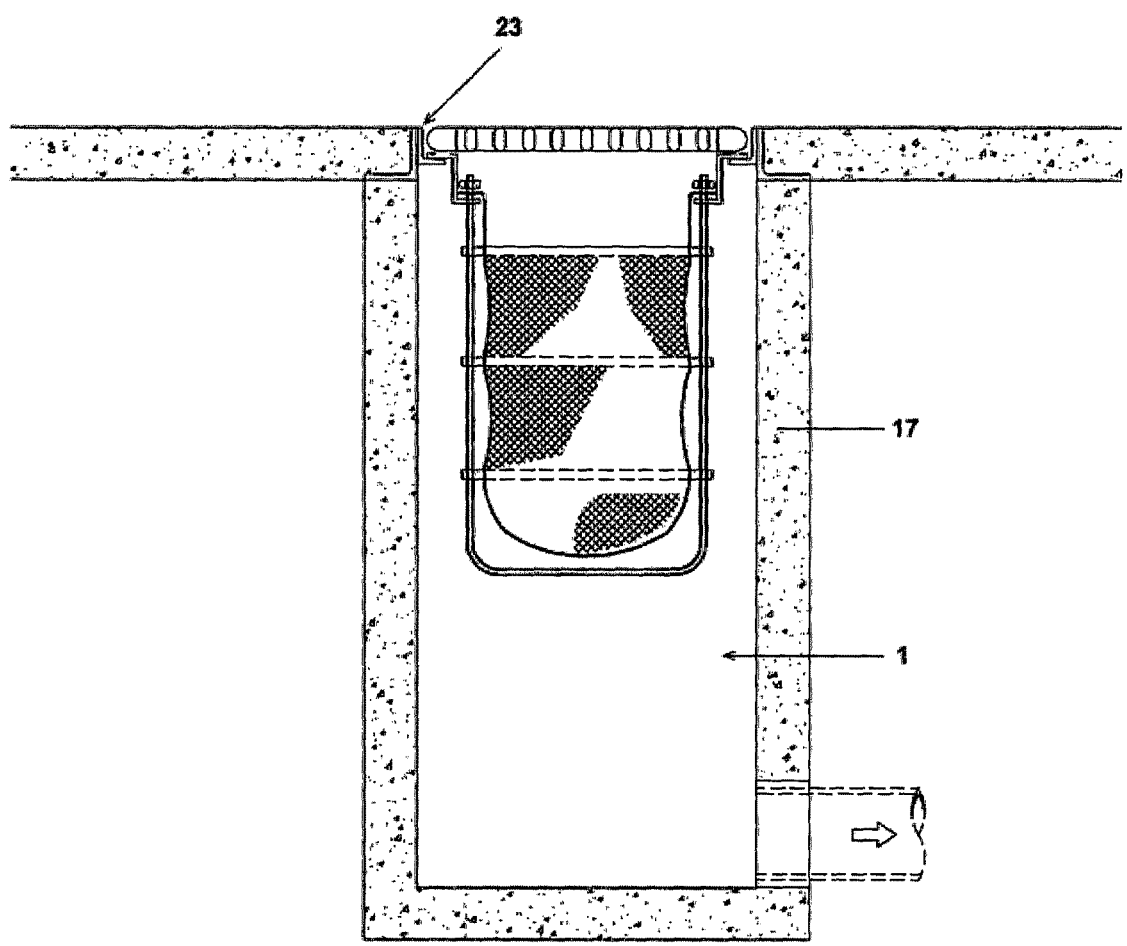
FIG. 8 shows a side view of a storm water drain filter secured to the grate of a pit.

The filter system 1 may be installed in a variety of ways. As shown in FIG. 6 the filter system may sit on the floor of pit 17. FIG. 7 shows a form of installation using cantilever arms 19 and 20. A rail 18 may be secured to a side wall of a pit 17 via fasteners 21 and 22. Cantilever arms 19 and 20 may then be engaged with rail 18 at the desired position and the filter system lowered into place to rest on arms 19 and 20. Alternatively the brackets 19 and 20 could be secured directly to the pit wall and rail 18 may be omitted. Alternatively as shown in FIG. 8 the filter system may be secured to the grate 23 of a pit 17.

Figure 9:
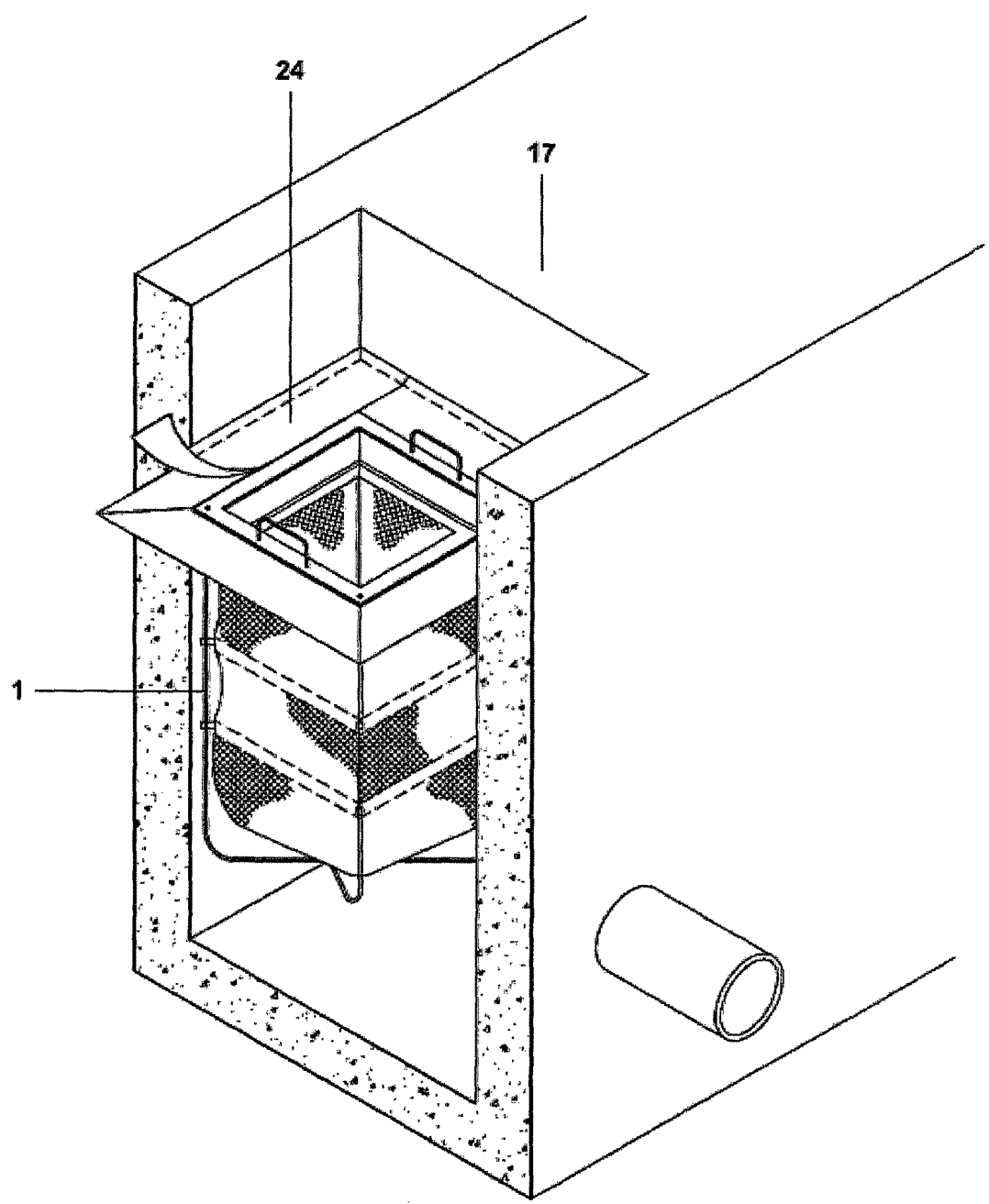
FIG. 9 illustrates a method of installing a storm water drain filter in a pit.

There can be issues in fitting filters to pits of varying dimensions to ensure all material passes through the filter system. FIG. 9 shows a method of fitting a filter system to ensure that all material passes through the filter. Once a filter system is installed by one of the above methods rubber seal and/or mastic and foam tape (such as BOA-TAPE™) may be applied attached between the top of the storm water drain filter and the pit opening to provide seal between the storm water drain filter system 1 and the pit 17. This method allows the filter system to be undersized for ease of installation and bridge any gaps using flexible tape. Alternatively a compressible sealing material, such as a compressible foam or rubber, may be provided between pit inlet 42 and the pit mouth.

Figure 10:
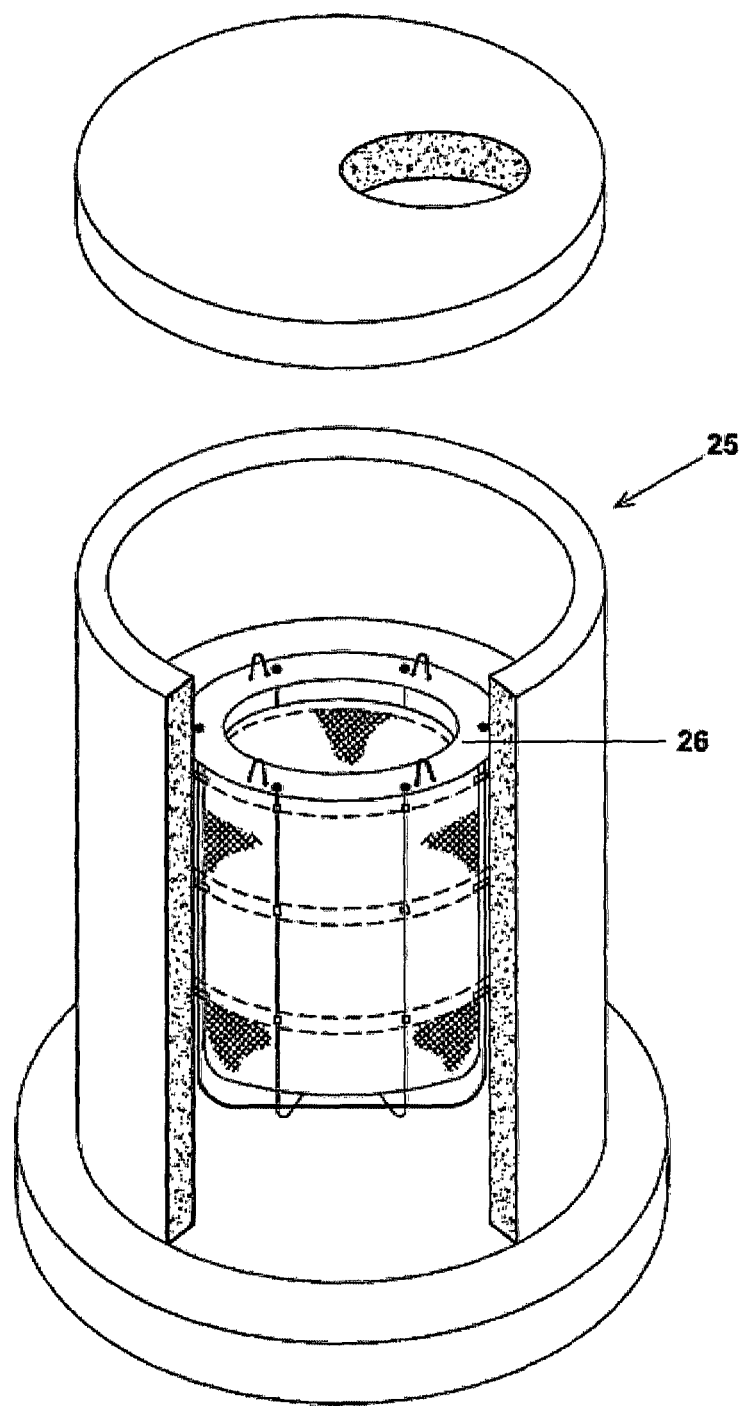
FIG. 10 shows a perspective view of a circular storm water drain filter installed in a pit.

FIG. 10 illustrates a filter system 25 having a circular cross section for use in circular pits. The filter systems may have a range of shapes depending upon the pit shape.

Figure 11:
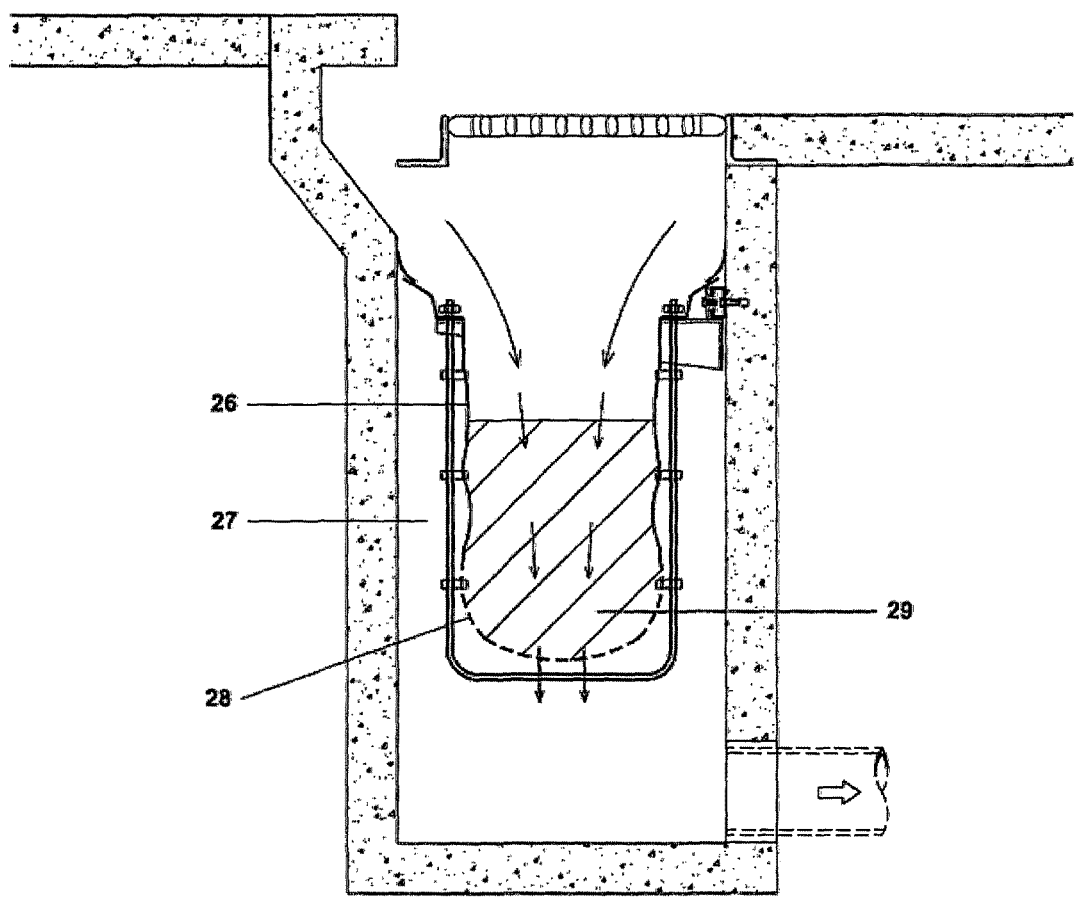
FIG. 11 shows a side view of a storm water drain filter having a filter bag with an upper impermeable section and a lower permeable section.

FIG. 11 shows an alternate embodiment in which the side walls 26 of bag 27 are impermeable and the base 28 of bag 27 is permeable. The base 28 of the bag 27 is filled with filtration media 29. The filtering media may be material filtered out by the filter system and/or introduced material selected from sand, Zeolite, rain garden mix, activated carbon, absorbents and adsorbents This construction ensures that introduced material passes through the filtering media 29 to remove contaminants. This method utilises stored contaminants in the filter and/or additional filter media (such as soil mix or other media mixes) to enhance treatment performance. Flow control may be achieved either by filter media aperture size or base mesh size. An overflow may be provided at the top of the bag to allow material to overflow in high flow conditions.

Figure 12:
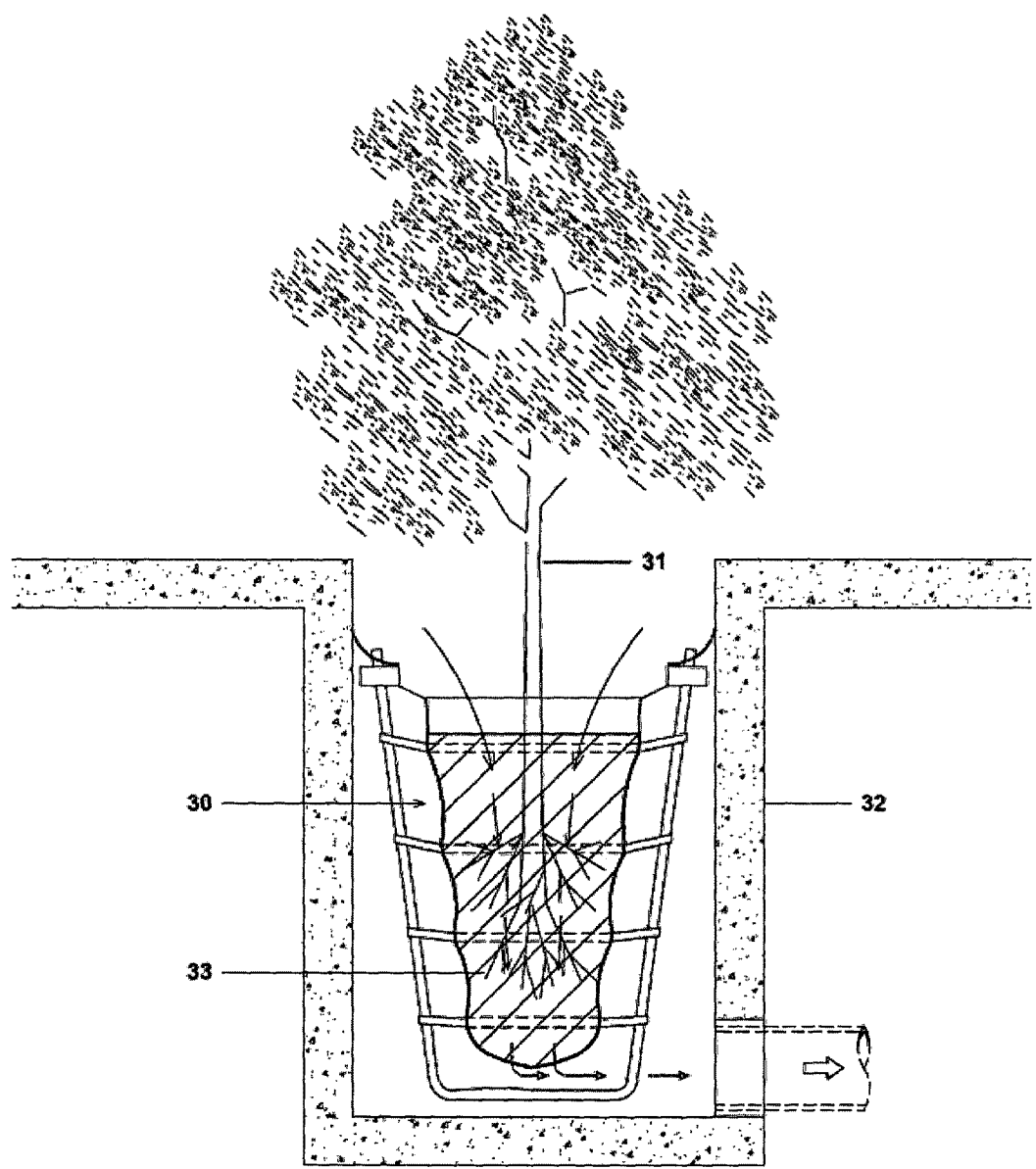
FIG. 12 illustrates an application of the storm water drain filter in which it is used as a planter.

FIG. 12 shows an embodiment in which a filter system 30 of the type shown in FIG. 11 within a pit 32 is used to contain a tree 31. Water entering filter system 30 passes through soil filtering media surrounding the tree into a filtering media such as Zeolite (which may ionically attract charged soluble metals etc.). Alternatively a bedding layer of Zeolite or activated carbon or other media may be provided in the base of the filter bag.

Figure 14:
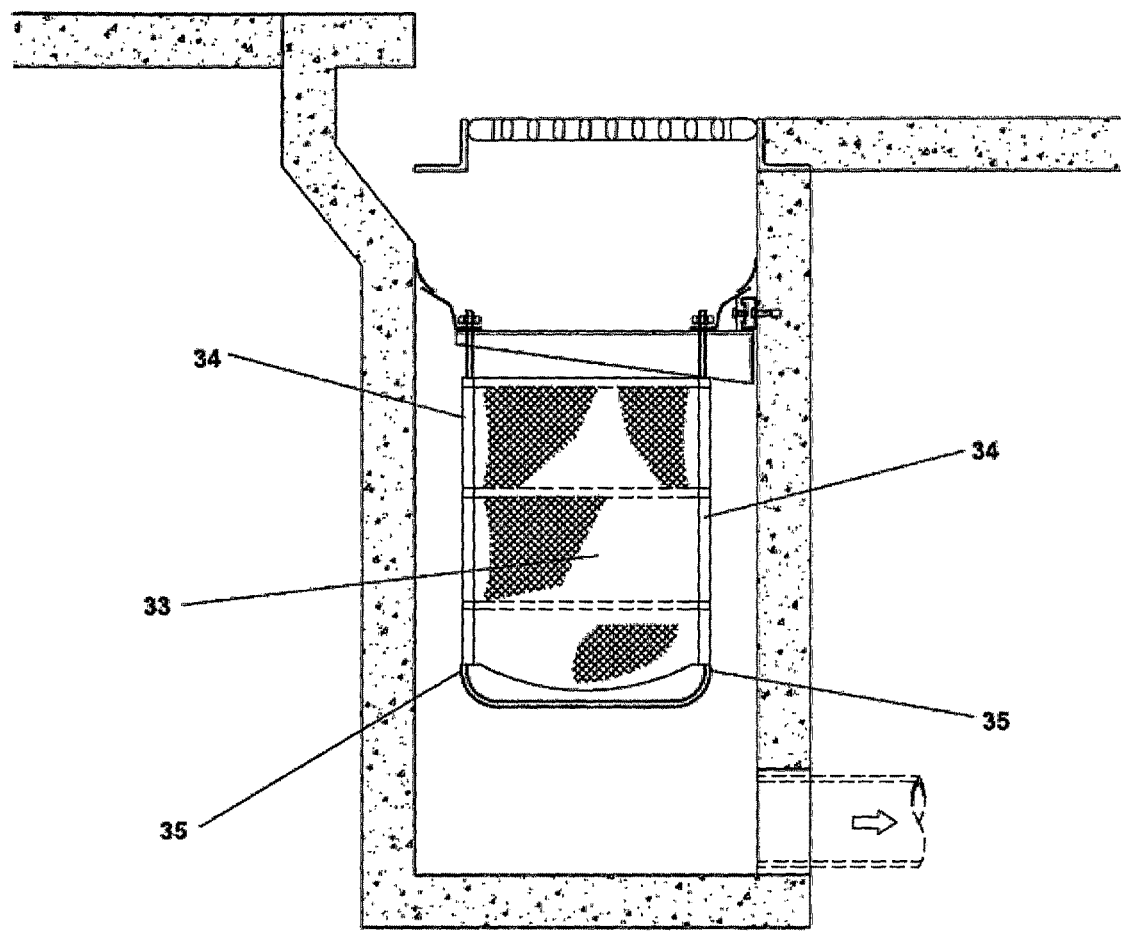
FIG. 14 illustrates an embodiment in which the side attachment elements of the stormwater drain filter form a continuous seam which the frame elements are inserted into.

FIG. 14 shows an embodiment in which filter bag 33 has sleeves 34 at each corner with rods 35 located within each sleeve 34 instead of using attachment elements as in previous embodiments. Sleeves 34 may be formed simply by sewing sides of bag 33 together a distance away from the corner.

Figure 13:
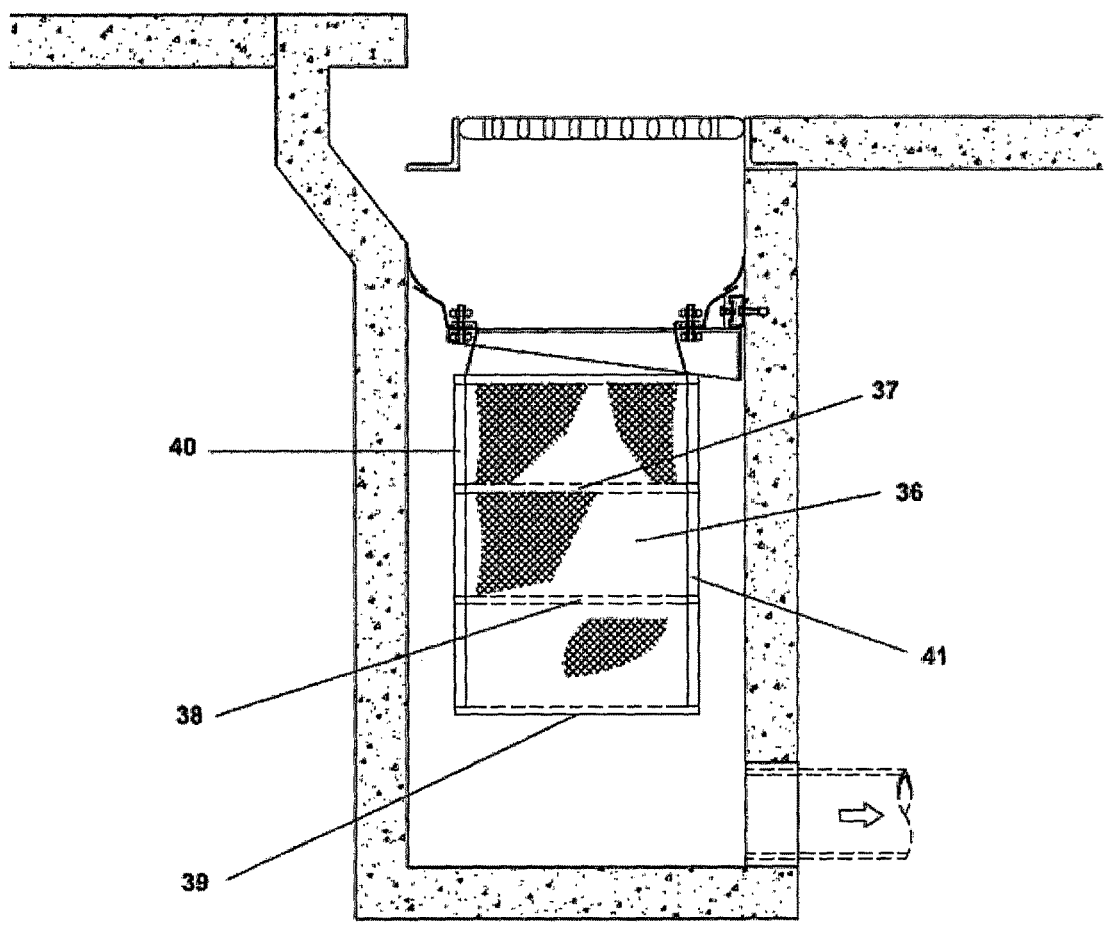
FIG. 13 illustrates an embodiment in which the vertical battens of the stormwater drain filter replace the frame elements inside the continuous seam.

FIG. 13 shows an embodiment in which no frame is employed. In this embodiment filter bag 36 hangs in the pit and includes rigid lateral stiffening elements 37, 38 and 39 to maintain the shape of the bag and prevent bulging. Longitudinal rigid stiffening elements 40 and 41 may also be provided to maintain longitudinal shape.

There is thus provided a filter system and components that are simple, reliable, light weight, inexpensive to manufacture, compact for transportation, retain their shape well, maximize filter area and storage volume and is easy to install and maintain.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A storm water filter bag having a base and a plurality of side walls joined at corners including rigid horizontal battens to support the bag and attachment elements at the corners positioned for engagement to a supporting frame such that as the bag fills bulging of the side walls of the bag is resisted by the attachment elements retaining the side walls in tension between the frame.

2. A storm water filter bag as claimed in claim 1 wherein the bag is formed of a permeable material.

3. A storm water filter bag as claimed in claim 2 wherein the bag is formed of a mesh material.

4. A storm water filter bag as claimed in claim 1 wherein the bag is at least partially formed of an impermeable material.

5. A storm water filter bag as claimed in claim 1 wherein the lower side walls of the bag are impermeable and the base of the bag is permeable.

6. A storm water filter bag as claimed in claim 5 wherein the base of the bag is filled with filtration media.

7. A storm water filter bag as claimed in claim 1 including horizontal battens along the upper edge of the bag.

8. A storm water filter bag as claimed in claim 1 including horizontal battens around the mid region of the bag.

9. A storm water filter bag as claimed in claim 1 including horizontal battens around the lower region of the bag.

10. A storm water filter bag as claimed in claim 1 including attachment elements to connect to a support frame.

11. A storm water filter bag as claimed in claim 10 wherein the attachment elements are detachable.

12. A storm water filter bag as claimed in claim 1 dimensioned to provide an overflow path at the top of the bag in use.

13. A storm water drain filter including:
   a. a collapsible frame consisting of a plurality of rigid elements that may be assembled to form a rigid frame and disassembled into a collapsed form for transport; and
   b. a bag having rigid horizontal battens to support the bag and connectors positioned about the periphery of the bag for attachment to the frame, when assembled, so as to restrain outward movement of the walls of the bag in use.

14. A storm water drain filter as claimed in claim 13, including a plurality of hoops connected at their ends to a top plate.

15. A storm water drain filter as claimed in claim 14 wherein the top plate includes lifting handles.

16. A storm water drain filter as claimed in claim 14 wherein the ends of the hoops are connected to the top plate by removable fasteners.

17. A storm water drain filter as claimed in claim 14 wherein the hoops are generally U shaped elements.

18. A storm water drain filter as claimed in claim 17 wherein 2 hoops are employed.

19. A storm water drain filter as claimed in claim 14 wherein the hoops are pivotally connected at the middle of each hoop.

20. A storm water drain filter as claimed in claim 13 wherein the frame includes a top plate.

21. A storm water drain filter as claimed in claim 20 wherein the top plate includes lifting fixtures.

22. A storm water drain filter as claimed in claim 20 wherein the top plate includes an inlet channel extending below the bag overflow provision.

23. A storm water drain filter as claimed claim 22 wherein the inlet channel is removable.

24. A storm water drain filter as claimed in claim 13 wherein an overflow gap is provided between the top of the bag and the plate.

25. A storm water drain filter as claimed in claim 13 including aggregate filter material in the bottom of the bag.

26. A storm water drain filter as claimed in claim 13 including a cantilever mounting arrangement to mount the storm water drain filter to a wall of a pit.

27. A plant container including:
   a. a rigid frame;
   b. a bag having rigid horizontal battens to support the bag and connectors positioned about the periphery of the bag for attachment to the frame, when assembled, so as to restrain outward movement of the walls of the bag in use; and
   c. a rain garden media provided in the base of the bag.

28. A plant container as claimed in claim 27 including a pit surrounding the plant container.

29. A storm water filter bag having a base and a plurality of side walls joined at corners having seams along the corners of the bag to accommodate elements of a support frame and having rigid horizontal battens between the corners such that as the bag fills bulging of the side walls of the bag is resisted by the corners retaining the side walls in tension between the frame.

* * * * *